US011422588B2

(12) United States Patent
Baek et al.

(10) Patent No.: US 11,422,588 B2
(45) Date of Patent: Aug. 23, 2022

(54) REMOTE CONTROL CASE AND ELECTRONIC DEVICE INCLUDING SAME

(71) Applicant: SAMSUNG ELECTRONICS CO., LTD., Suwon-si (KR)

(72) Inventors: Sangin Baek, Suwon-si (KR); Jaeho Kang, Suwon-si (KR); Minsung Lee, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 16/615,257

(22) PCT Filed: May 8, 2018

(86) PCT No.: PCT/KR2018/005266
§ 371 (c)(1),
(2) Date: Nov. 20, 2019

(87) PCT Pub. No.: WO2019/022350
PCT Pub. Date: Jan. 31, 2019

(65) Prior Publication Data
US 2020/0103938 A1 Apr. 2, 2020

(30) Foreign Application Priority Data

Jul. 24, 2017 (KR) .......................... 10-2017-0093648

(51) Int. Cl.
G06F 1/16 (2006.01)
G06F 3/041 (2006.01)
(Continued)

(52) U.S. Cl.
CPC ......... G06F 1/1626 (2013.01); G05D 1/0016 (2013.01); G06F 1/1637 (2013.01);
(Continued)

(58) Field of Classification Search
CPC .. G06F 1/1626; G06F 3/04166; G06F 1/1637; G06F 1/1656; G05D 1/0016; G12B 9/04
(Continued)

(56) References Cited

U.S. PATENT DOCUMENTS 6,530,838 B2 * 3/2003 Ha .......................... A63F 13/24
463/36
2005/0220067 A1 * 10/2005 Engstrom ............... G06F 1/169
370/343
(Continued)

FOREIGN PATENT DOCUMENTS

JP 2009-025881 2/2009
JP 2010-073071 4/2010
(Continued)

OTHER PUBLICATIONS

Office Action dated Jul. 30, 2021 in counterpart Korean Application No. 10-2017-0093648 and English-language translation.
(Continued)

Primary Examiner — William D Titcomb
(74) Attorney, Agent, or Firm — Nixon & Vanderhye, P.C.

(57) ABSTRACT

Various embodiments of the present invention relate to a remote control case and an electronic device including the same, the remote control case comprising: a cover unit for covering at least a part of a front surface of the electronic device; a first grip unit integrally formed with a first cross sectional surface of the cover unit, and extended in a first direction of the cover unit so as to have a predetermined area; and a second grip unit integrally formed with a second cross sectional surface of the cover unit, and extended in a second direction of the cover unit so as to have a predetermined area, wherein the cover unit comprises a first control
(Continued)

unit having a predetermined shape and a first boundary line, and a second control unit having a predetermined shape and a second boundary line, so as to enable the remote control case to be normally mounted on the back surface of the electronic device and carried, and to be mounted on the front surface of the electronic device so as to be used for controlling an unmanned aerial vehicle, an unmanned ground vehicle, an unmanned ship, and the like, when the unmanned aerial vehicle, the unmanned ground vehicle, the unmanned ship, and the like are controlled, such that convenience of portability is provided to a user and boundary characteristics of a physical area (for example, a height difference, a central protruded part, a boundary line, a guide protruded part, an inclined surface, and the like) for controlling the unmanned aerial vehicle, the unmanned ground vehicle, the unmanned ship, and the like, are provided to the first and second control units, thereby enabling the user to intuitively control, without continuously staring at a screen, the unmanned aerial vehicle, the unmanned ground vehicle, the unmanned ship, and the like. Other various embodiments are possible other than the various embodiments provided in the present invention.

14 Claims, 18 Drawing Sheets

(51) Int. Cl.
*G05D 1/00* (2006.01)
*G12B 9/04* (2006.01)
*G06F 3/04847* (2022.01)
*G06F 3/0488* (2022.01)

(52) U.S. Cl.
CPC ........ *G06F 1/1656* (2013.01); *G06F 3/04166* (2019.05); *G12B 9/04* (2013.01); *G06F 3/0488* (2013.01); *G06F 3/04847* (2013.01)

(58) Field of Classification Search
USPC ....................................................... 150/161
See application file for complete search history.

(56) References Cited

U.S. PATENT DOCUMENTS

| | | | | |
|---|---|---|---|---|
| 2006/0181517 | A1* | 8/2006 | Zadesky | G06F 3/045 345/173 |
| 2010/0302168 | A1 | 12/2010 | Giancarlo et al. | |
| 2011/0035079 | A1* | 2/2011 | Allen | G05D 1/0016 701/2 |
| 2011/0310029 | A1* | 12/2011 | Uttermann | G06F 3/0414 345/173 |
| 2013/0095925 | A1* | 4/2013 | Xu | G06F 1/169 463/37 |
| 2013/0141212 | A1* | 6/2013 | Pickering | H04B 1/3888 340/5.61 |
| 2013/0278566 | A1* | 10/2013 | Aldana | G06F 1/1637 345/204 |
| 2014/0111912 | A1* | 4/2014 | Gobeil | G06F 1/1632 361/679.01 |
| 2014/0188308 | A1* | 7/2014 | Allen | G05D 1/0016 701/2 |
| 2014/0191962 | A1 | 7/2014 | Kim | |
| 2014/0247246 | A1* | 9/2014 | Maus | G06F 3/0443 345/174 |
| 2014/0354570 | A1* | 12/2014 | Makinen | G06F 3/04886 345/173 |
| 2015/0163393 | A1 | 6/2015 | Kim | |
| 2015/0193103 | A1 | 7/2015 | Moon et al. | |
| 2016/0227013 | A1* | 8/2016 | Na | H04B 1/3888 |
| 2017/0308077 | A1* | 10/2017 | Iskrev | G05D 1/0016 |
| 2017/0322674 | A1* | 11/2017 | Rosenberg | G06F 3/04146 |
| 2018/0046176 | A1 | 2/2018 | Kim | |
| 2018/0188822 | A1 | 7/2018 | Kim et al. | |
| 2019/0007084 | A1* | 1/2019 | Haug | H04B 1/3888 |

FOREIGN PATENT DOCUMENTS

| | | |
|---|---|---|
| JP | 2012-063976 | 3/2012 |
| KR | 10-1219676 | 1/2013 |
| KR | 10-2015-0081708 | 7/2015 |
| KR | 10-1546717 | 8/2015 |
| KR | 10-1560814 | 10/2015 |
| KR | 10-2016-0095451 | 8/2016 |
| KR | 10-2016-0150547 | 12/2016 |
| KR | 10-2017-0001434 | 1/2017 |

OTHER PUBLICATIONS

International Search Report for PCT/KR2018/005266 dated Aug. 7, 2018, 4 pages.
Written Opinion of the ISA for PCT/KR2018/005266 dated Aug. 7, 2018, 8 pages.

* cited by examiner

REMOTE CONTROL CASE AND ELECTRONIC DEVICE INCLUDING SAME

This application is the U.S. national phase of International Application No. PCT/KR2018/005266 filed May 8, 2018 which designated the U.S. and claims priority to KR Patent Application No. 10-2017-0093648 filed Jul. 24, 2017, the entire contents of each of which are hereby incorporated by reference.

FIELD

Various embodiments of the disclosure relate to a remote control case and an electronic device including the same.

DESCRIPTION OF RELATED ART

An unmanned aerial vehicle is a vehicle that can be remotely controlled without a boarded pilot.

The unmanned aerial vehicle may be referred to as various names such as a drone and an unmanned aircraft system. In a broad sense, the unmanned aerial vehicle may include an unmanned ground vehicle.

The unmanned aerial vehicle may be used for various purposes such as shooting, reconnaissance, broadcasting, industrial, leisure, lifesaving, and courier services.

With various uses of the unmanned aerial vehicle, there are various methods of manipulating the unmanned aerial vehicle.

For example, the unmanned aerial vehicle may be remotely controlled using a separate remote controller or using an electronic device such as a portable terminal (e.g., a smart phone) having a flight application installed therein.

SUMMARY

When a separate remote controller is used for manipulating an unmanned aerial vehicle, an unmanned ground vehicle, an unmanned ship, or the like, a big and heavy remote controller may be inconvenient to carry.

A flight application installed in the electronic device such as the portable terminal may be difficult of a precise control because of manipulating the unmanned aerial vehicle, the unmanned ground vehicle, the unmanned ship, etc. by touching a screen of the electronic device rather than using a physical key and joystick. In addition, even if a touch position on the screen is out of a control area during manipulation while watching the unmanned aerial vehicle, the unmanned ground vehicle, the unmanned ship, etc., the user may not easily recognize this and may not be able to perform an accurate control. Also, because the user is required to check the touch position on the screen of the electronic device such as the portable terminal as well as check the movement of the unmanned aerial vehicle, the unmanned ground vehicle, the unmanned ship, etc., the fatigue of controlling the unmanned aerial vehicle, the unmanned ground vehicle, the unmanned ship, etc. may be increased.

Various embodiments of the disclosure may provide a remote control case and an electronic device having the same. The remote control case may be usually mounted on the rear surface of the electronic device such as the portable terminal, and mounted on the front surface of the electronic device when used to manipulate the unmanned aerial vehicle, the unmanned ground vehicle, the unmanned ship, or the like.

According to various embodiments of the disclosure, a remote control case may include a cover for covering at least a part of a front surface of an electronic device; a first gripper integrally formed with a first end surface of the cover and extended in a first direction of the cover so as to have a predetermined area; and a second gripper integrally formed with a second end surface of the cover and extended in a second direction of the cover so as to have a predetermined area. The cover may include a first controller having a specific shape and a first boundary; and a second controller having a specific shape and a second boundary.

According to various embodiments of the disclosure, an electronic device including a remote control case may include a wireless communication unit transmitting and receiving a remote control signal; a touch screen receiving a manipulation signal inputted through the remote control case and displaying a screen for manipulating an unmanned object; a hall IC detecting, through a magnet disposed in the remote control case, that the remote control case is mounted on a front surface of the electronic device; a memory storing a program for manipulating the unmanned object; and a processor electrically connected to the memory. The processor may be configured to automatically execute the unmanned object manipulating program stored in the memory when the magnet disposed in the remote control case coincides in position with the hall IC embedded in the electronic device.

According to various embodiments of the disclosure, the remote control case may be usually mounted on the rear surface of the electronic device such as the portable terminal, and mounted on the front surface of the electronic device when used to manipulate the unmanned aerial vehicle, the unmanned ground vehicle, the unmanned ship, or the like. This offers convenience of portability to a user.

In addition, according to various embodiments of the disclosure, the remote control case may have at least one controller provided with boundary characteristics (e.g., a height difference, a central protrusion, a boundary, a guide protrusion, an inclined plane, and the like) of a physical area for controlling the unmanned aerial vehicle, the unmanned ground vehicle, the unmanned ship, or the like. This allows a user to intuitively control, without continuously staring at a screen, the unmanned aerial vehicle, the unmanned ground vehicle, the unmanned ship, or the like.

In addition, according to various embodiments of the disclosure, the remote control case that is mounted on at least a part of the front or rear surface of the electronic device may also perform a cover function for protecting the electronic device.

DETAILED DESCRIPTION OF EXAMPLE EMBODIMENTS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

Figure 1A:
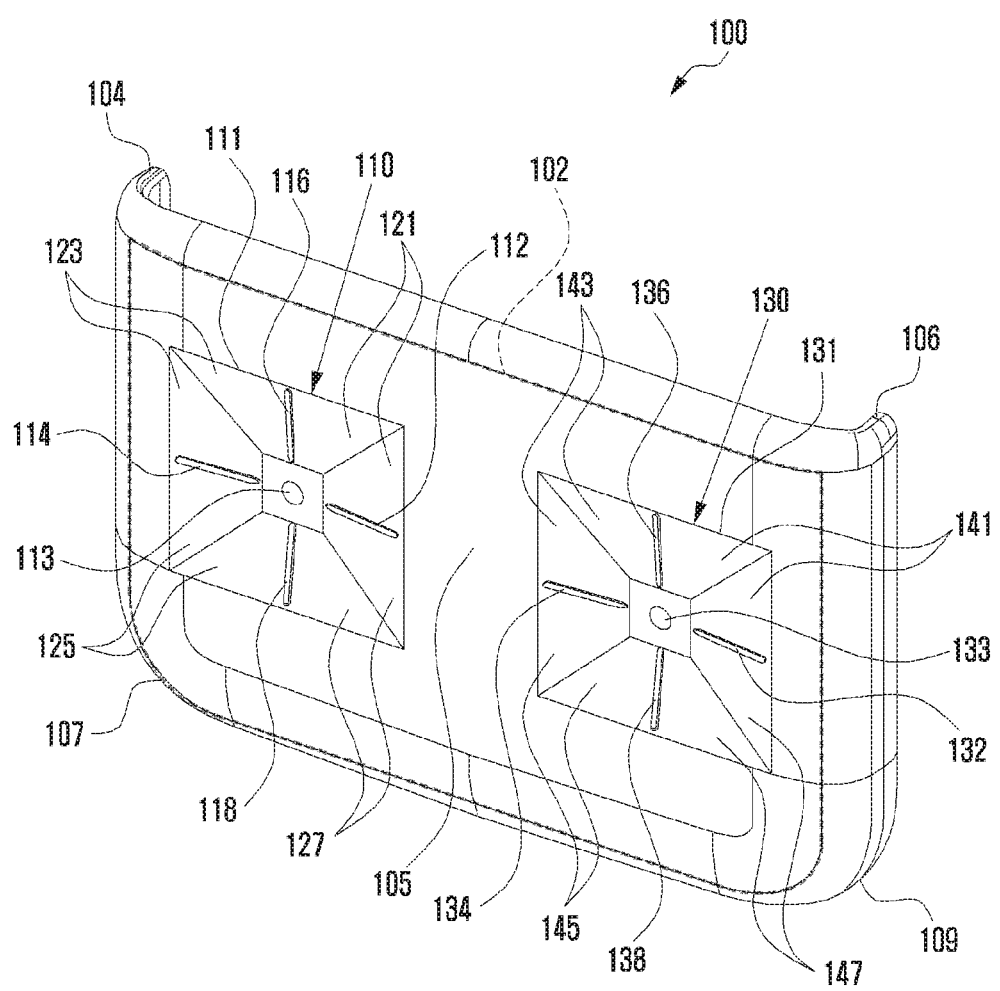
FIG. 1A is a diagram illustrating a front surface of a remote control case according to various embodiments of the disclosure.
Figure 1B:
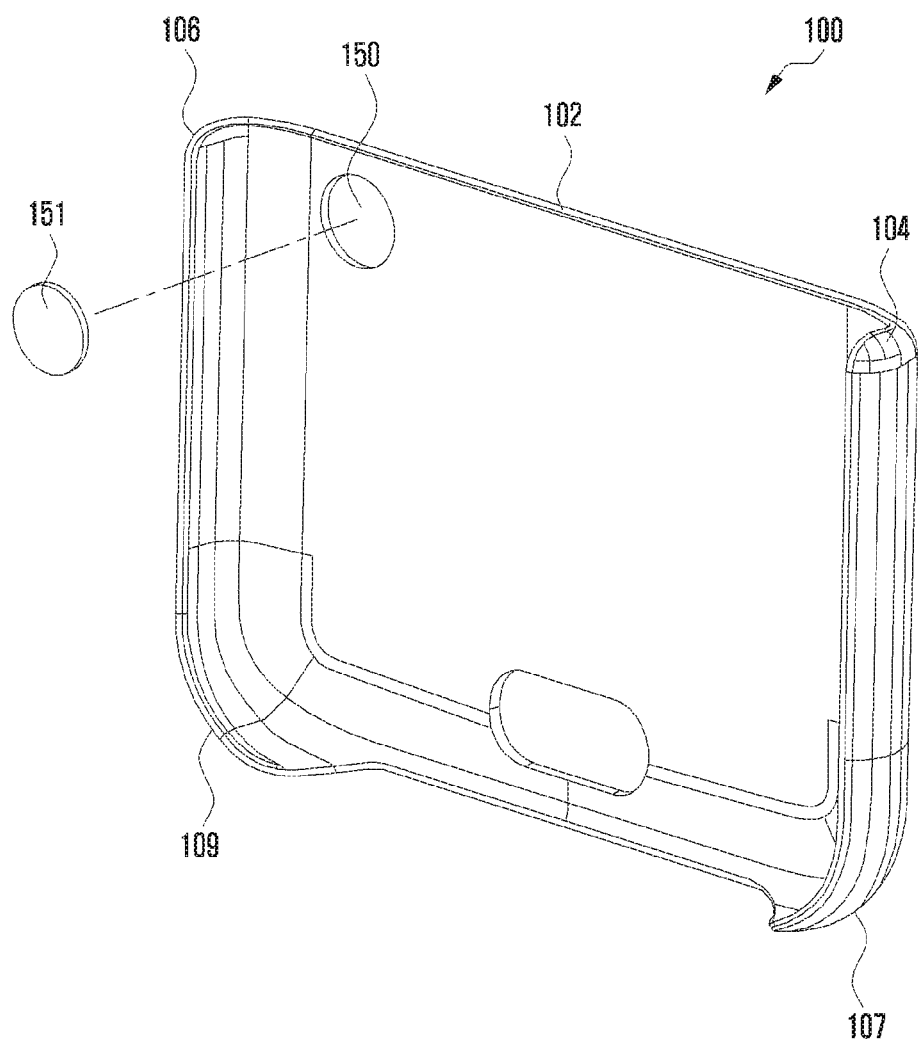
FIG. 1B is a diagram illustrating a rear surface of a remote control case according to various embodiments of the disclosure.

Hereinafter, a remote control case and an electronic device having the same according to various embodiments of the disclosure will be described with reference to the accompanying drawings. FIG. 1A is a diagram illustrating a front surface of a remote control case according to various embodiments of the disclosure. FIG. 1B is a diagram illustrating a rear surface of a remote control case according to various embodiments of the disclosure.

The remote control case according to various embodiments of the disclosure may remotely control an unmanned object (e.g., an unmanned aerial vehicle, an unmanned ground vehicle, an unmanned ship, and the like). Various embodiments of the disclosure may be equally applied to the unmanned aerial vehicle, the unmanned ground vehicle, the unmanned ship, and the like.

Referring to FIGS. 1A and 1B, the remote control case 100 according to various embodiments of the disclosure may include a cover 102, a first gripper 104, a second gripper 106, a first controller 110, and a second controller 130.

The cover 102 may cover at least a part of the front or rear surface of an electronic device (e.g., the electronic device 200 in FIG. 2) such as a smart phone. The cover 102 may include a non-control area 105 other than the first controller 110 and the second controller 130. A control area composed of the first controller 110 and the second controller 130 may be different in surface roughness from the non-control area 105 so that the user can identify them tactilely.

The first gripper 104 may have a certain area and be integrally formed with a first end surface of the cover 102. The first gripper 104 may extend in a first direction (e.g., vertically) of the cover 102. The first gripper 104 may form a certain angle (e.g., about 85~90 degrees) with the cover 102. An end portion of the first gripper 104 may be bent inward to form an undercut so as to grip one side of the electronic device (e.g., the electronic device 200 in FIG. 2). The first gripper 104 may grip one side of the electronic device (e.g., the electronic device 200 in FIG. 2).

A lower portion of the first gripper 104 may be integrally formed with a first supporter 107. When the remote control case 100 is mounted on the front or rear surface of the electronic device (e.g., the electronic device 200 in FIG. 2), the first supporter 107 may support the electronic device so that the electronic device is not separated downward from the remote control case 100. The first supporter 107 may be formed at least partially on a lower portion of the cover 102.

The second gripper 106 may have a certain area and be integrally formed with a second end surface of the cover 102. The second gripper 106 may extend in a second direction (e.g., vertically) of the cover 102. The second gripper 106 may form a certain angle (e.g., about 85~90 degrees) with the cover 102. An end portion of the second gripper 106 may be bent inward to form an undercut so as to grip the other side of the electronic device (e.g., the electronic device 200 in FIG. 2). The second gripper 106 may grip the other side of the electronic device (e.g., the electronic device 200 in FIG. 2).

A lower portion of the second gripper 106 may be integrally formed with a second supporter 109. When the remote control case 100 is mounted on the front or rear surface of the electronic device (e.g., the electronic device 200 in FIG. 2), the second supporter 109 may support the electronic device so that the electronic device is not separated downward from the remote control case 100. The second supporter 109 may be formed at least partially on a lower portion of the cover 102.

According to various embodiments, the first controller 110 may include a first boundary 111, a first central protrusion 113, a first right guide 112, a first left guide 114, a first top guide 116, and a first bottom guide 118.

Figure 7:
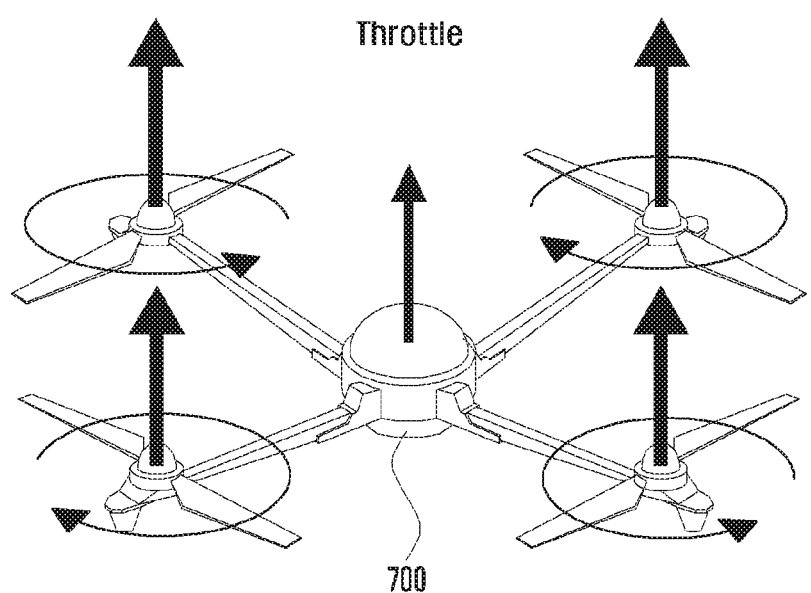
FIGS. 7, 8, and 9 are diagrams illustrating examples of control through first and second controllers of a remote control case according to various embodiments of the disclosure.

The first controller 110 may control, for example, a first function and a second function of an unmanned aerial vehicle (e.g., the unmanned aerial vehicle 700 in FIG. 7). The first function may be a throttle function that controls the rising and falling of the unmanned aerial vehicle. The second function may be a yaw function that controls the left and right rotations of the unmanned aerial vehicle.

The first boundary 111 may have a predetermined shape (e.g., rectangular). The first boundary 111 may form a boundary distinguished from the non-control area 105 and the second controller 130. The first boundary 111 may have at least one of protrusion, unevenness, and surface roughness to be perceivable as a tactile sense by a user. The surface roughness may include at least one of irregularities or variations. Any other manner may be used for forming the first boundary 111 as long as the user can recognize.

The first central protrusion 113 may be formed at the center of the first controller 110. The first central protrusion 113 may allow the user manipulating the first controller 110 to intuitively recognize the center of the first controller 110. The first central protrusion 113 may be lower or higher than the cover 102 or the first boundary 111.

The first right guide 112 may extend from the first central protrusion 113 to a right side (e.g., in a first direction) of the first boundary 111. The first right guide 112 may include, at least in part, a protrusion. The first right guide 112 may allow the user to intuitively recognize a rightward manipulation of the first controller 110.

The first left guide 114 may extend from the first central protrusion 113 to a left side (e.g., in a second direction) of the first boundary 111. The first left guide 114 may include, at least in part, a protrusion. The first left guide 114 may allow the user to intuitively recognize a leftward manipulation of the first controller 110.

The first top guide 116 may extend from the first central protrusion 113 to a top side (e.g., in a third direction) of the first boundary 111. The first top guide 116 may include, at least in part, a protrusion. The first top guide 116 may allow the user to intuitively recognize an upward manipulation of the first controller 110.

The first bottom guide 118 may extend from the first central protrusion 113 to a bottom side (e.g., in a fourth direction) of the first boundary 111. The first bottom guide 118 may include, at least in part, a protrusion. The first bottom guide 118 may allow the user to intuitively recognize a downward manipulation of the first controller 110.

Between the first right guide 112 and the first top guide 116, at least one first top-right inclined plane 121 may be formed. The at least one first top-right inclined plane 121 may allow the user manipulating the first controller 110 to intuitively recognize a right upward diagonal direction and angle. In embodiments, the at least one first top-right inclined plane 121 may be inclined to be higher or lower from the first boundary 111 toward the first central protrusion 113.

Between the first left guide 114 and the first top guide 116, at least one first top-left inclined plane 123 may be formed. The at least one first top-left inclined plane 123 may allow the user manipulating the first controller 110 to intuitively recognize a left upward diagonal direction and angle. In embodiments, the at least one first top-left inclined plane 123 may be inclined to be higher or lower from the first boundary 111 toward the first central protrusion 113.

Between the first left guide 114 and the first bottom guide 118, at least one first bottom-left inclined plane 125 may be formed. The at least one first bottom-left inclined plane 125 may allow the user manipulating the first controller 110 to intuitively recognize a left downward diagonal direction and angle. In embodiments, the at least one first bottom-left inclined plane 125 may be inclined to be higher or lower from the first boundary 111 toward the first central protrusion 113.

Between the first bottom guide 118 and the first right guide 112, at least one first bottom-right inclined plane 127 may be formed. The at least one first bottom-right inclined plane 127 may allow the user manipulating the first controller 110 to intuitively recognize a right downward diagonal direction and angle. In embodiments, the at least one first bottom-right inclined plane 127 may be inclined to be higher or lower from the first boundary 111 toward the first central protrusion 113.

According to various embodiments, the second controller 130 may include a second boundary 131, a second central protrusion 133, a second right guide 132, a second left guide 134, a second top guide 136, and a second bottom guide 138.

The second controller 130 may control, for example, a third function and a fourth function of an unmanned aerial vehicle (e.g., the unmanned aerial vehicle 700 in FIG. 7). The third function may be a pitch function that controls the forward and backward movements of the unmanned aerial vehicle. The fourth function may be a roll function that controls the leftward and rightward movements of the unmanned aerial vehicle.

The second boundary 131 may have a predetermined shape (e.g., rectangular). The second boundary 131 may form a boundary distinguished from the non-control area 105 and the first controller 110. The second boundary 131 may have at least one of protrusion, unevenness, and surface roughness to be perceivable as a tactile sense by a user. The surface roughness may include at least one of irregularities or variations. Any other manner may be used for forming the second boundary 131 as long as the user can recognize.

The second central protrusion 133 may be formed at the center of the second controller 130. The second central protrusion 133 may allow the user manipulating the second controller 130 to intuitively recognize the center of the second controller 130. The second central protrusion 133 may be lower or higher than the cover 102 or the second boundary 131.

The second right guide 132 may extend from the second central protrusion 133 to a right side (e.g., in a first direction) of the second boundary 131. The second right guide 132 may include, at least in part, a protrusion. The second right guide 132 may allow the user to intuitively recognize a rightward manipulation of the second controller 130.

The second left guide 134 may extend from the second central protrusion 133 to a left side (e.g., in a second direction) of the second boundary 131. The second left guide 134 may include, at least in part, a protrusion. The second left guide 134 may allow the user to intuitively recognize a leftward manipulation of the second controller 130.

The second top guide 136 may extend from the second central protrusion 133 to a top side (e.g., in a third direction) of the second boundary 131. The second top guide 136 may include, at least in part, a protrusion. The second top guide 136 may allow the user to intuitively recognize an upward manipulation of the second controller 130.

The second bottom guide 138 may extend from the second central protrusion 133 to a bottom side (e.g., in a fourth direction) of the second boundary 131. The second bottom guide 138 may include, at least in part, a protrusion. The second bottom guide 138 may allow the user to intuitively recognize a downward manipulation of the second controller 130.

Between the second right guide 132 and the second top guide 136, at least one second top-right inclined plane 141 may be formed. The at least one second top-right inclined plane 141 may allow the user manipulating the second controller 130 to intuitively recognize a right upward diagonal direction and angle. In embodiments, the at least one second top-right inclined plane 141 may be inclined to be higher or lower from the second boundary 131 toward the second central protrusion 133.

Between the second left guide 134 and the second top guide 136, at least one second top-left inclined plane 143 may be formed. The at least one second top-left inclined plane 143 may allow the user manipulating the second controller 130 to intuitively recognize a left upward diagonal direction and angle. In embodiments, the at least one second top-left inclined plane 143 may be inclined to be higher or lower from the second boundary 131 toward the second central protrusion 133.

Between the second left guide 134 and the second bottom guide 138, at least one second bottom-left inclined plane 145 may be formed. The at least one second bottom-left inclined plane 145 may allow the user manipulating the second controller 130 to intuitively recognize a left downward diagonal direction and angle. In embodiments, the at least one second bottom-left inclined plane 145 may be inclined to be higher or lower from the second boundary 131 toward the second central protrusion 133.

Between the second bottom guide 138 and the second right guide 132, at least one second bottom-right inclined plane 147 may be formed. The at least one second bottom-right inclined plane 147 may allow the user manipulating the second controller 130 to intuitively recognize a right downward diagonal direction and angle. In embodiments, the at least one second bottom-right inclined plane 147 may be inclined to be higher or lower from the second boundary 131 toward the second central protrusion 133.

Referring to FIG. 1B, the remote control case 100 according to various embodiments of the disclosure may include a magnet receiving cavity 150 for mounting a magnet 151 on a rear surface thereof.

Figure 2:
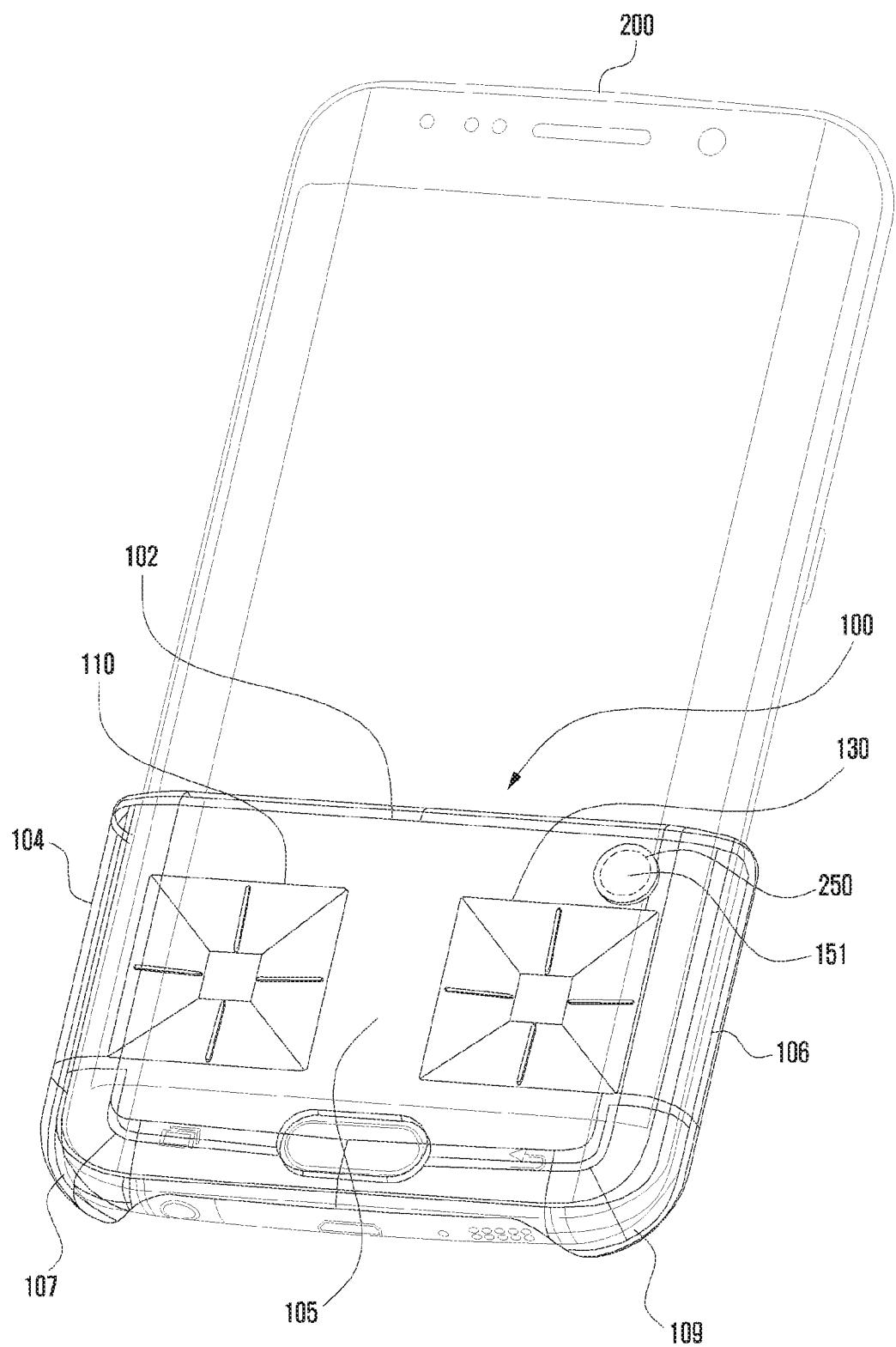
FIG. 2 is a diagram illustrating an example in which a remote control case according to various embodiments of the disclosure is mounted on a front surface of an electronic device.

FIG. 2 is a diagram illustrating an example in which a remote control case according to various embodiments of the disclosure is mounted on a front surface of an electronic device.

Referring to FIG. 2, the remote control case 100 according to various embodiments of the disclosure may be usually mounted on the rear surface of the electronic device 200 to carry. In case of manipulating an unmanned aerial vehicle, the remote control case 100 may be mounted on the front surface of the electronic device 200 and used for remote control of the unmanned aerial vehicle. The remote control case 100 may be disposed to cover at least a portion of the front or rear surface of the electronic device 200.

The cover 102, the first gripper 104, the first supporter 107, the second gripper 106, and the second supporter 109 may form together a hooking structure that allows the remote control case 100 to be mounted on the front or rear surface of the electronic device 200.

The first and second supporters 107 and 109 may support the electronic device 200 such that the electronic device 200 does not escape downward from the remote control case 100 when the remote control case 100 is mounted on the front or rear surface of the electronic device 200.

According to various embodiments, when the remote control case 100 is mounted on the front surface of the electronic device 200, and when the magnet 151 disposed in the magnet receiving cavity 150 as discussed above in FIG. 1B coincides in position with a hall IC 250 embedded in the electronic device 200, the electronic device 200 may automatically enter a flight application execution mode for manipulating an unmanned aerial vehicle.

According to various embodiments, when the magnet 151 disposed in the magnet receiving cavity 150 coincides in position with the hall IC 250 embedded in the electronic device 200, the electronic device 200 may increase touch and proximity touch (e.g., hovering) sensitivities in a mounting area where the remote control case 100 is mounted. On the other hand, the electronic device 200 may ignore touch and proximity touch (e.g., hovering) signals in the remaining area other than the mounting area. In addition, the electronic device 200 may ignore touch signals in the non-control area 105 other than the first and second controllers 110 and 130 of the remote control case 100. Also, the electronic device 200 may control a touch screen (e.g., the touch screen 220 in FIG. 5) to display a flight application screen only on the remaining area other than the mounting area.

Figure 3:
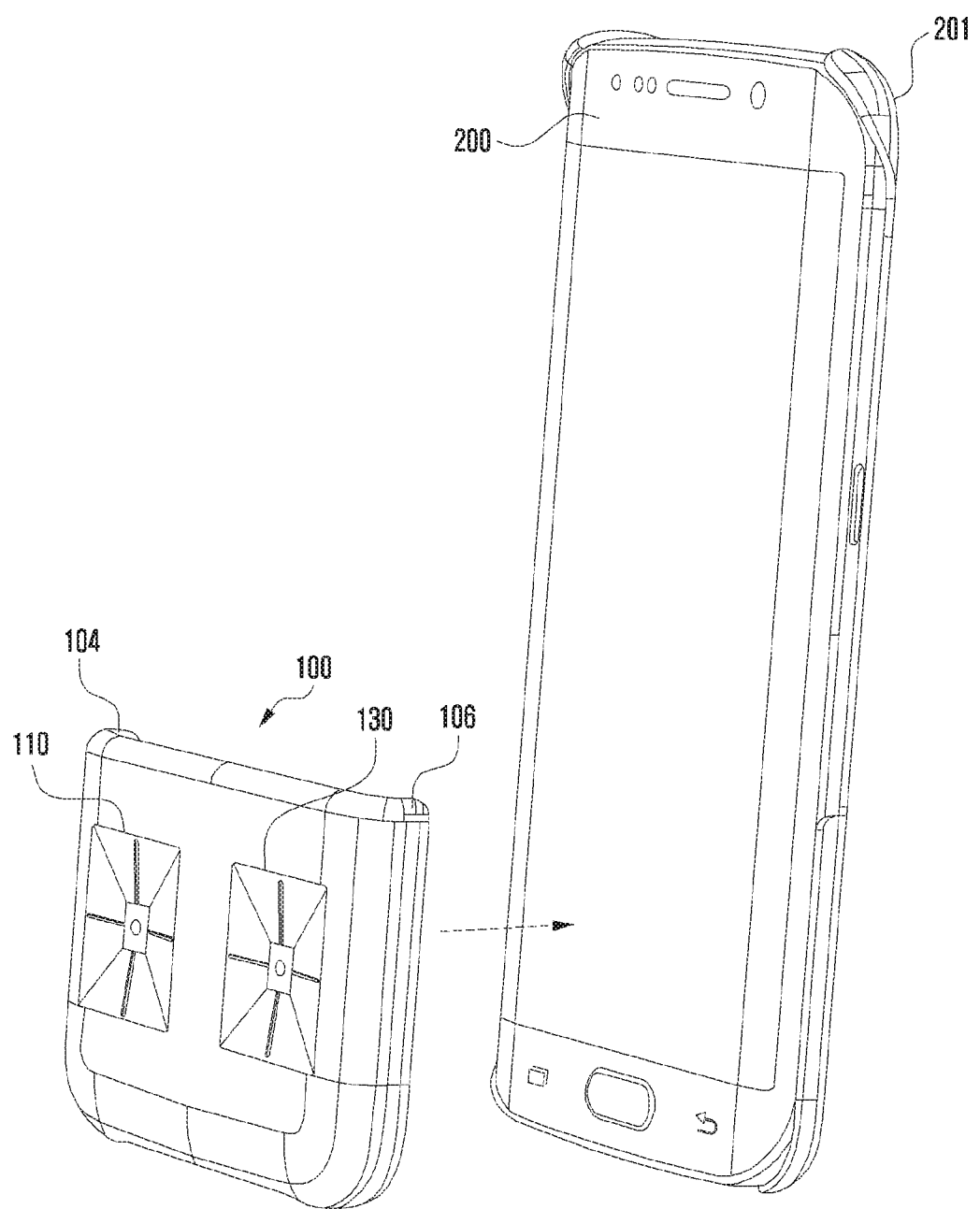
FIG. 3 is a diagram illustrating another example in which a remote control case according to various embodiments of the disclosure is mounted on a front surface of an electronic device.

FIG. 3 is a diagram illustrating another example in which a remote control case according to various embodiments of the disclosure is mounted on a front surface of an electronic device.

Referring to FIG. 3, on the rear surface of the electronic device 200 according to various embodiments of the disclosure, a protective cover 201 may be disposed to cover and protect the electronic device 200.

The remote control case 100 according to various embodiments of the disclosure may be usually mounted on the protective cover 201 disposed on the rear surface of the electronic device 200. In case of manipulating an unmanned aerial vehicle (e.g., the unmanned aerial vehicle 700 in FIG. 7), the remote control case 100 may be mounted on the front surface of the electronic device 200 and used for remote control of the unmanned aerial vehicle. The remote control case 100 may be disposed to cover at least a portion of the front or rear surface of the electronic device 200. In this case, the first gripper 104 and the second gripper 106 of the remote control case 100 may be extended in length so as to further grip the protective cover 201.

Figure 4:
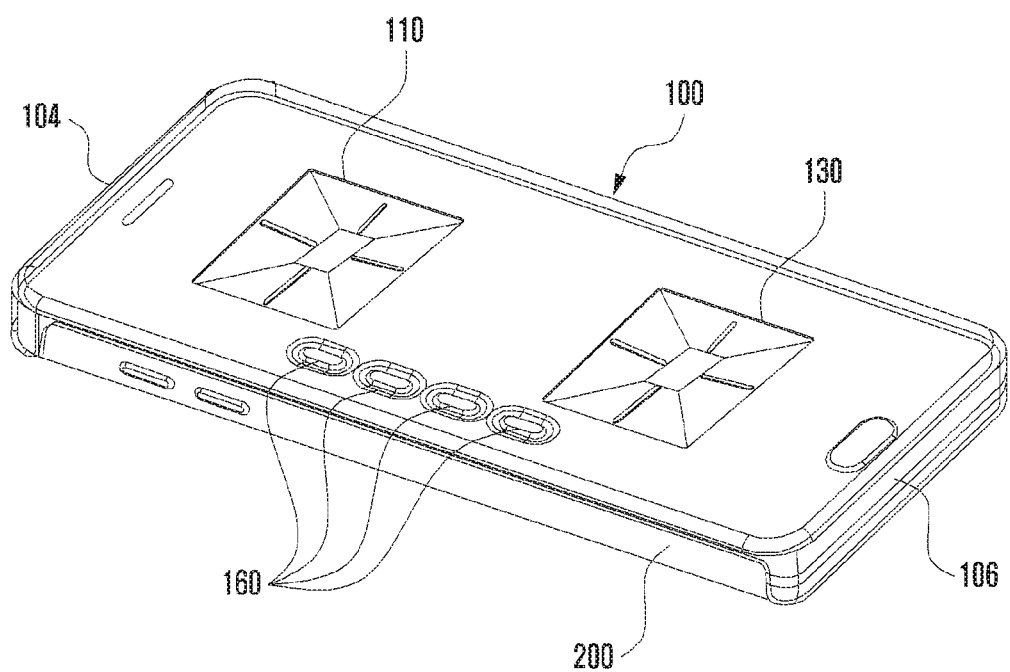
FIG. 4 is a diagram illustrating still another example in which a remote control case according to various embodiments of the disclosure is mounted on a front surface of an electronic device.

FIG. 4 is a diagram illustrating still another example in which a remote control case according to various embodiments of the disclosure is mounted on a front surface of an electronic device.

Referring to FIG. 4, the remote control case 100 according to various embodiments of the disclosure may cover the entire front surface of the electronic device 200. When the remote control case 100 partially covers the electronic device 200 as shown in FIGS. 2 and 3, the electronic device 200 may be used for controlling an unmanned aerial vehicle (e.g., the unmanned aerial vehicle 700 in FIG. 7) while standing vertically. In contrast, when the remote control case 100 fully covers the electronic device 200 as shown in FIG. 4, the electronic device 200 may be used for controlling the unmanned aerial vehicle while lying down horizontally.

According to various embodiments, the remote control case 100 may include one or more physical keys 160 at certain position(s). The physical keys 160 may provide a click feeling to a user.

According to an embodiment, as described above, the first controller 110 may control a throttle function (e.g., a first function) to control the rising and falling of an unmanned aerial vehicle (e.g., the unmanned aerial vehicle 700 in FIG. 7), and also control a yaw function (e.g., a second function) to control the left and right rotations of the unmanned aerial vehicle. The second controller 130 may control a pitch function (e.g., a third function) to control the forward and backward movements of the unmanned aerial vehicle, and also control a roll function (e.g., a third function) to control the leftward and rightward movements of the unmanned aerial vehicle.

The physical keys 160 may perform particular functions other than the first to fourth functions that can be controlled through the first and second controller 110 and 130. For example, the physical keys 160 may include keys for performing functions of starting, pausing, resetting, and terminating an unmanned aerial vehicle controlling operation.

Figure 5:
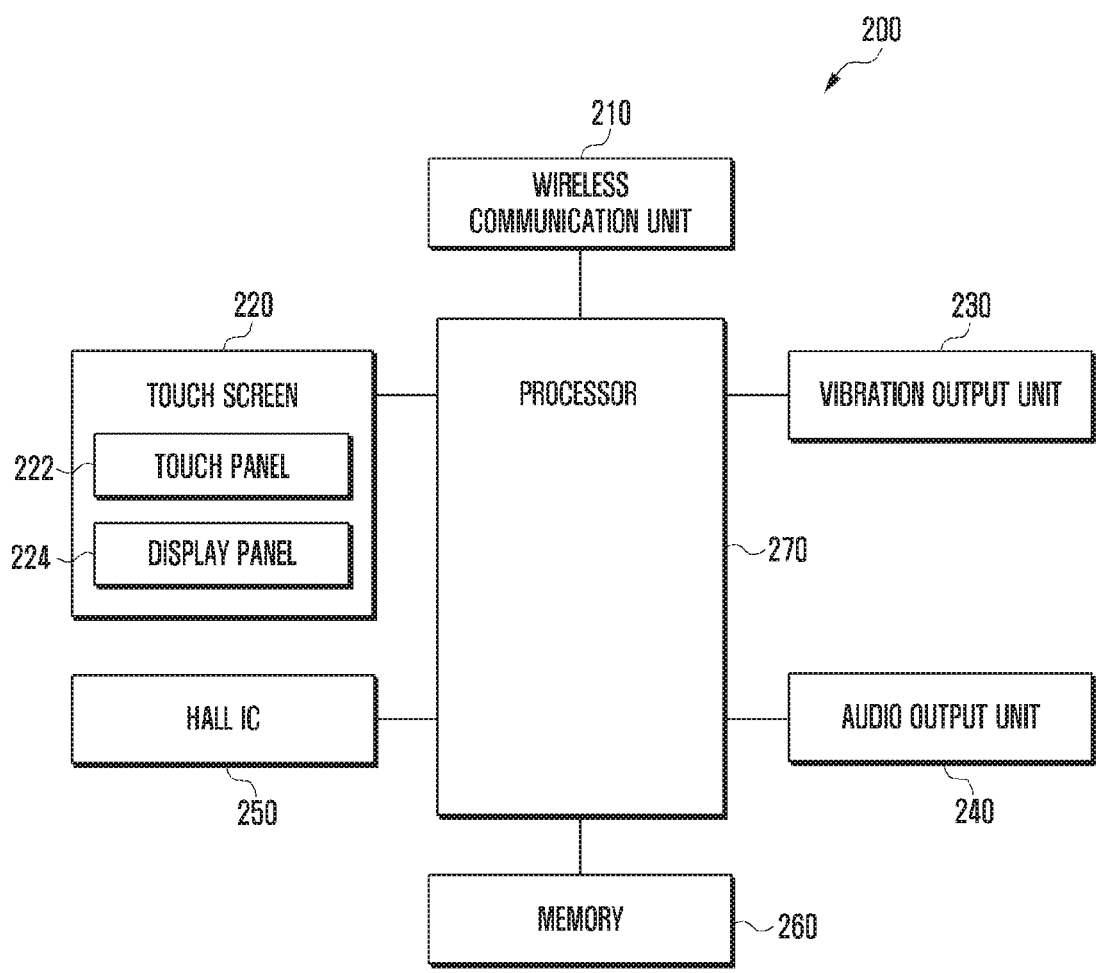
FIG. 5 is a diagram illustrating a configuration of an electronic device according to various embodiments of the disclosure.

FIG. 5 is a diagram illustrating a configuration of an electronic device according to various embodiments of the disclosure.

Referring to FIG. 5, the electronic device 200 according to various embodiments of the disclosure may include a wireless communication unit 210, a touch screen 220, a vibration output unit 230, an audio output unit 240, a hall IC 250, a memory 260, and a processor 270.

The wireless communication unit 210 may form a communication channel for allowing the electronic device 200 to control the flight of an unmanned aerial vehicle (e.g., the unmanned aerial vehicle 700 in FIG. 7).

The wireless communication unit 210 may include an RF transmitter for up-converting the frequency of an outgoing signal and amplifying the signal, an RF receiver for low-noise-amplifying an incoming signal and down-converting the frequency of the signal, and the like. Also, the wireless communication unit 210 may receive data from the unmanned aerial vehicle through a wireless channel, output this data to the processor 270, receive data from the processor 270, and transmit this data to the unmanned aerial vehicle through a wireless channel.

According to various embodiments, the wireless communication unit 210 may include, for example, at least one of Bluetooth, Bluetooth low energy (BLE), Zigbee, near field communication (NFC), magnetic secure transmission, radio frequency (RF), or a body area network (BAN). According to an embodiment, the wireless communication may include GNSS. The GNSS may be, for example, a global positioning system (GPS), a global navigation satellite system (Glonass), a Beidou navigation satellite system (in brief, Beiduou), or a Galileo which is the European global satellite-based navigation system.

The touch screen 220 may receive an unmanned aerial vehicle control signal inputted through the above-described remote control case 100. The touch screen 220 may display a screen for controlling an unmanned aerial vehicle (e.g., the unmanned aerial vehicle 700 in FIG. 7).

The touch screen 220 may perform an input function and a display function. For this, the touch screen 220 may include a touch panel 222 and a display 224.

The touch panel 222 may detect a touch signal and a proximity touch (e.g., hovering) signal inputted through the first and second controllers 110 and 130 of the remote control case 100.

According to various embodiments, the touch panel 222 may be composed of a touch sensor of capacitive overlay type, resistive overlay type, or infrared beam type, or composed of a pressure sensor. Any other kind of sensor device capable of detecting contact or pressure of an object may be used for the touch panel 222. When detecting a user's touch or proximity touch (e.g., hovering) input through the first and second controllers 110 and 130, the touch panel 222 may generate a detection signal and transmit it to the processor 270. The detection signal may contain touch direction information, touch angle information, and the like.

The display 224 may display a user interface (e.g. Out of Control Area) for notifying a deviation to a user when a user's touch is deviated from a control area such as the first and second controllers 110 and 130 of the remote control case 100.

According to various embodiments, the display 224 may be composed of a liquid crystal display (LCD), organic light emitting diodes (OLED), active matrix organic light emitting diodes (AMOLED), or the like. The display 224 may visually offer a menu, input data, function setting information, and other various kinds of information of the electronic device 200 to the user.

The vibration output unit 230 may provide a vibration signal to a user of the electronic device 200 when a user's touch is deviated from a control area such as the first and second controllers 110 and 130 of the remote control case 100. The vibration output unit 230 may include a haptic device capable of tactilely notifying control area deviation information to the user of the electronic device 200.

The audio output unit 240 may output an audio signal when a user's touch is deviated from a control area such as the first and second controllers 110 and 130 of the remote control case 100. The audio output unit 240 may include a speaker for outputting a deviation notifying voice (e.g., your touch is out of control area) or any other audio signal stored in the memory 260.

The hall IC 250 may detect the magnet 151 disposed in the magnet receiving cavity 150 of the remote control case 100, and thereby recognize that the remote control case 100 is mounted on the front surface of the electronic device 200.

The memory 260 may store a flight application for controlling an unmanned aerial vehicle (e.g., the unmanned aerial vehicle 700 in FIG. 7). The memory 260 may store a user interface (UI), a notifying voice, vibration strength information, etc. for notifying the user that a user's touch is deviated from a control area such as the first and second controllers 110 and 130 of the remote control case 100.

According to various embodiments, the memory 260 may store a program for controlling the overall operation of the electronic device 200, a program for processing and controlling of the processor 270, an operating system (OS), and input/output data. The memory 260 may store various kinds of setting information required for the electronic device 200 to perform a function related to various embodiments of the disclosure.

The processor 270 may control functions and operations of the wireless communication unit 210, the touch screen 220, the vibration output unit 230, the audio output unit 240, the hall IC 250, and the memory 260 in the electronic device 200.

According to an embodiment, when the remote control case 100 is mounted on the touch screen 220 of the electronic device 200, and when the magnet 151 disposed in the magnet receiving cavity 150 coincides in position with the hall IC 250 embedded in the electronic device 200, the processor 270 may automatically execute the flight application stored in the memory 260. In this case, the processor 270 may increase touch and proximity touch (e.g., hovering) sensitivities in a mounting area where the remote control case 100 is mounted. On the other hand, the processor 270 may ignore touch and proximity touch (e.g., hovering) signals in the remaining area other than the mounting area. In addition, the processor 270 may ignore touch and proximity touch (e.g., hovering) signals in the non-control area 105 other than the first and second controllers 110 and 130 of the remote control case 100. Also, the processor 270 may control the touch screen 220 to display a flight application screen only on the remaining area other than the mounting area.

According to various embodiments, the processor 270 may control an overall operation of the electronic device 200 and a signal flow between internal elements, and may perform a function of processing data. The processor 270 may be composed, for example, of a central processing unit (CPU), an application processor, a communication processor, and the like. The processor 270 may be formed of a single core processor or a multi-core processor, and may be configured of a plurality of processors.

Figure 6:
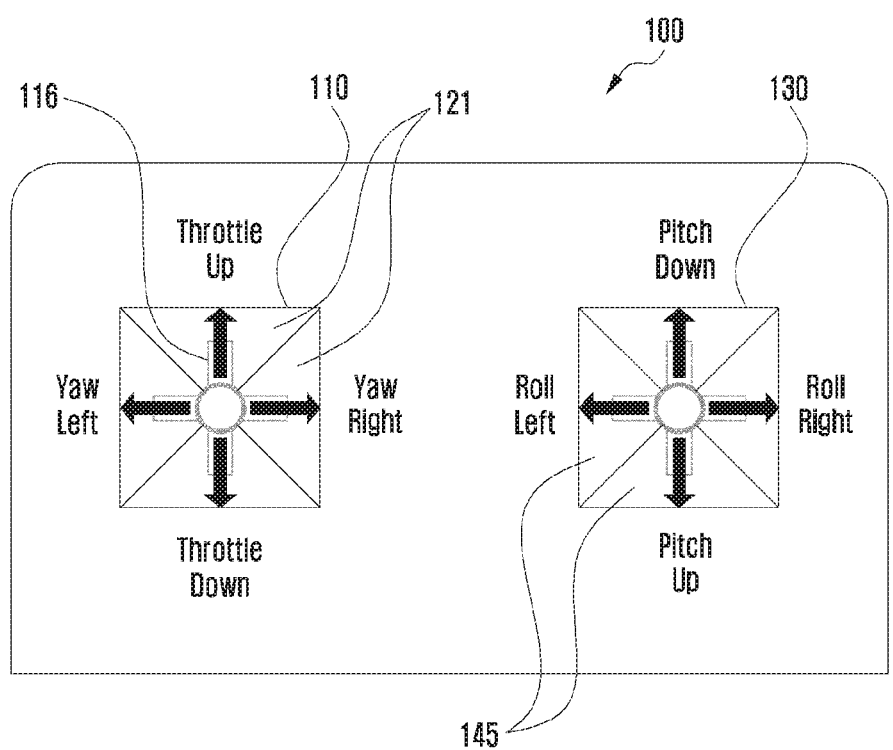
FIG. 6 is a diagram illustrating an example of functions of first and second controllers of a remote control case according to various embodiments of the disclosure.

FIG. 6 is a diagram illustrating an example of functions of first and second controllers of a remote control case according to various embodiments of the disclosure.

Referring to FIG. 6, the first controller 110 of the remote control case 100 according to various embodiments of the disclosure may control, for example, first and second functions of an unmanned aerial vehicle (e.g., the unmanned aerial vehicle 700 in FIG. 7). The first function may be a throttle up and throttle down function that controls the rising and falling of the unmanned aerial vehicle. The second function may be a yaw left and yaw right function that controls the left and right rotations of the unmanned aerial vehicle.

The second controller 130 may control, for example, third and fourth functions of the unmanned aerial vehicle. The third function may be a pitch down and pitch up function that controls the forward and backward movements of the unmanned aerial vehicle. The fourth function may be a roll left and roll right function that controls the leftward and rightward movements of the unmanned aerial vehicle.

According to various embodiments, both the first controller 110 and the second controller 130 of the remote control case 100 may have circular shapes. The first controller 110 may have a circular shape, and the second controller 130 may have a rectangular shape. The first controller 110 may have a rectangular shape, and the second controller 130 may have a circular shape. Both the first controller 110 and the second controller 130 may have rectangular shapes.

Figure 8:
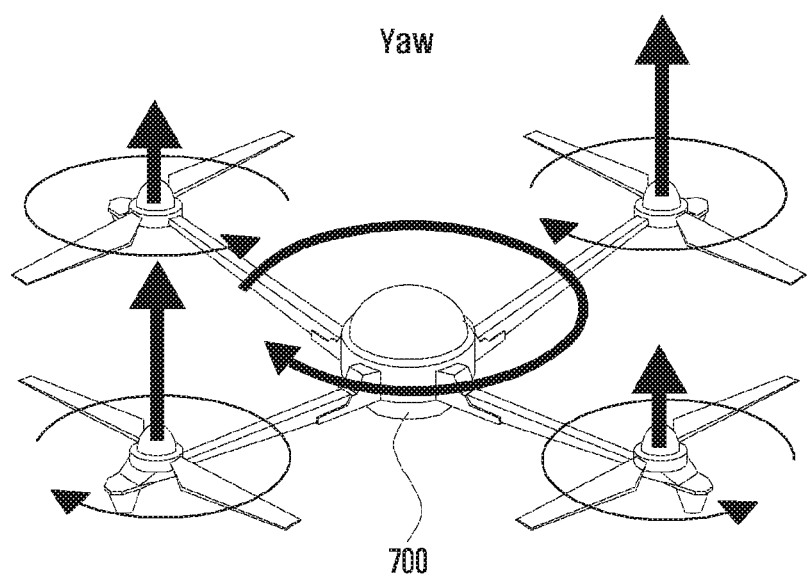
Figure 9:
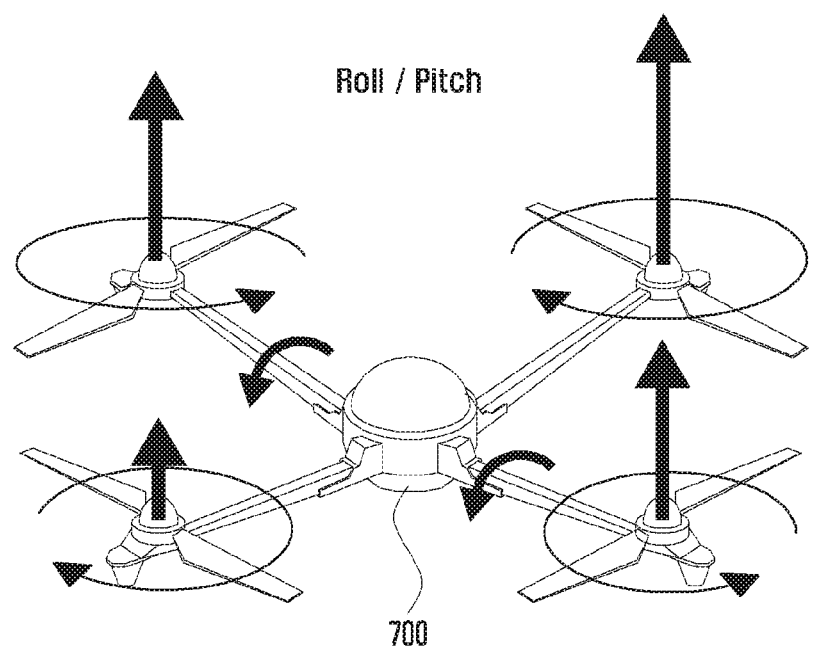

FIGS. 7 to 9 are diagrams illustrating examples of control through first and second controllers of a remote control case according to various embodiments of the disclosure.

Referring to FIG. 7, when a user touches upward the first top guide 116 (e.g., see FIG. 6) of the first controller 110 of the remote control case 100 with a finger to execute the throttle up function, the unmanned aerial vehicle 700 may rise.

Referring to FIG. 8, when a user touches upward the first top-right inclined plane 121 (e.g., see FIG. 6) of the first controller 110 of the remote control case 100 with a finger to execute the throttle up and yaw right functions, the unmanned aerial vehicle 700 may rise while rotating to the right.

Referring to FIG. 9, when a user touches downward the second bottom-left inclined plane 145 (e.g., see FIG. 6) of the second controller 130 of the remote control case 100 with a finger to execute the roll left and pitch up functions, the unmanned aerial vehicle 700 may move left rearward.

Figure 10:
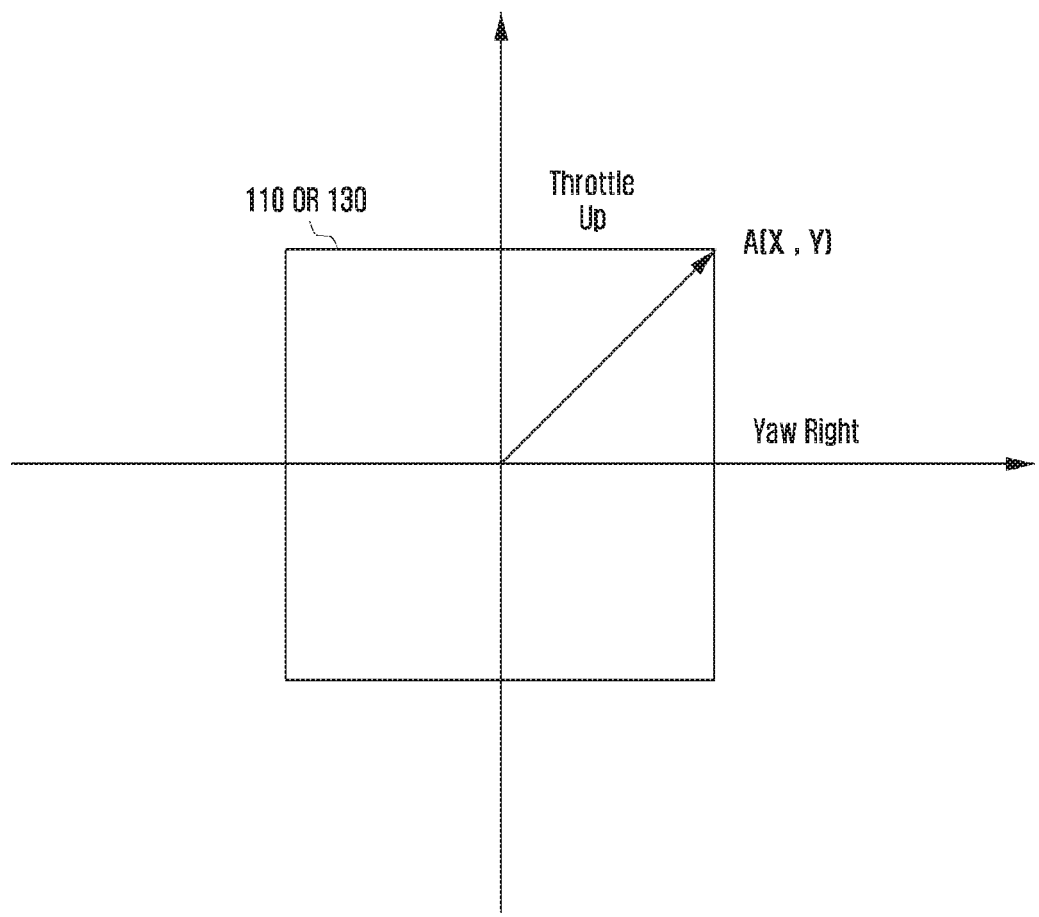
FIG. 10 is a diagram illustrating a reason why first and second controllers of a remote control case according to various embodiments of the disclosure have a rectangular shape.

FIG. 10 is a diagram illustrating a reason why first and second controllers of a remote control case according to various embodiments of the disclosure have a rectangular shape.

Referring to FIG. 10, each of the first and second controllers 110 and 130 of the remote control case 100 according to various embodiments of the disclosure may have a rectangular shape.

In case where each of the first and second controllers 110 and 130 is formed in a circular shape, if a user touches upward the first top-right inclined plane 121 (e.g., see FIG. 6) of the first controller 110 with a finger to execute the throttle up and yaw right functions, such a touch manipulation signal can be inputted only up to 70% (i.e., 100*sin 45°, 100*cos 45°).

However, if each of the first and second controllers 110 and 130 has a rectangular shape as in various embodiments, the sensitivity of an input signal is increased to 100% compared to case of a circular shape. That is, when a user touches upward the first top-right inclined plane 121 (e.g., see FIG. 6) of the first controller 110 with a finger to execute the throttle up and yaw right functions, a touch manipulation range in the diagonal direction (see A(X, Y)) from the first central protrusion 113 of the first controller 110 to the first boundary 111 will be longer than in case of a circular shape. Thus, the signal can be inputted with 100%.

Figure 11:
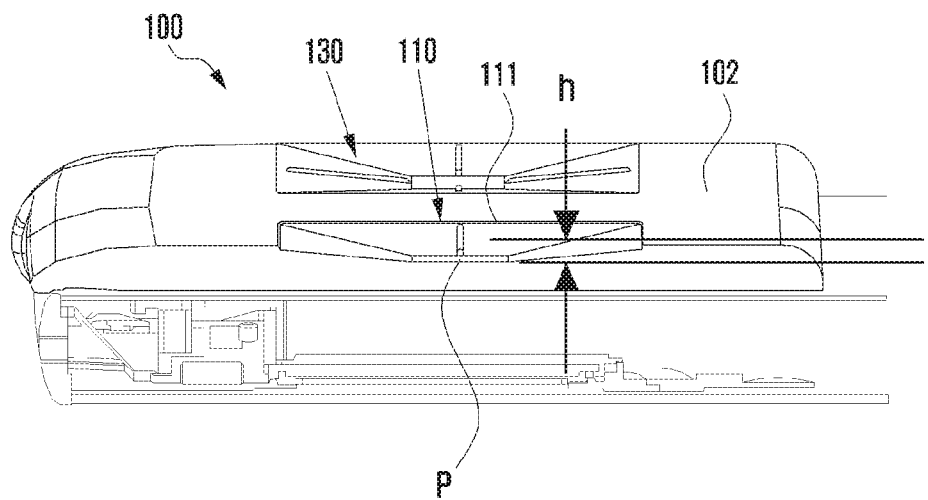
FIGS. 11 and 12 are diagrams illustrating a height difference of a first or second controller of a remote control case according to various embodiments of the disclosure.
Figure 12:
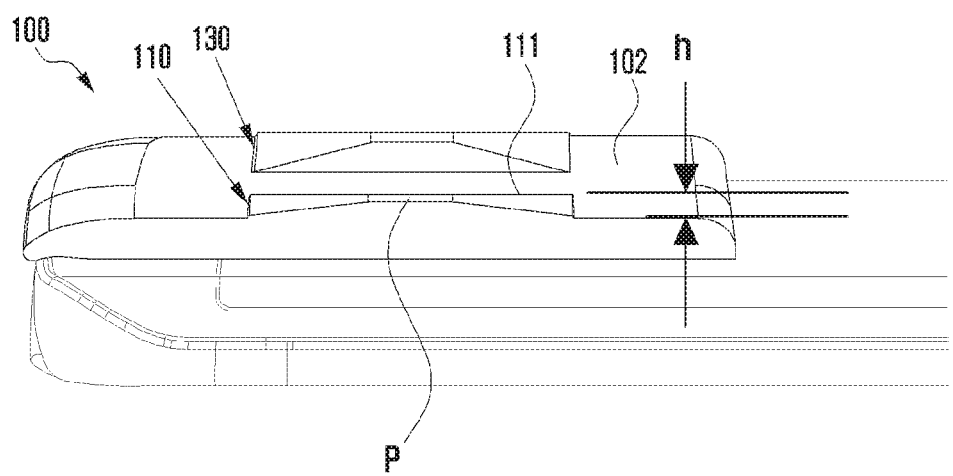

FIGS. 11 and 12 are diagrams illustrating a height difference of a first or second controller of a remote control case according to various embodiments of the disclosure.

Referring to FIG. 11, in the remote control case 100 according to various embodiments of the disclosure, the center of the first controller 110 (or the second controller 130) may be lower than the cover 102. In an embodiment, the first controller 110 (or the second controller 130) of the remote control case 100 may be inclined to be lower from the rectangular first boundary 111 toward the center (P).

Referring to FIG. 12, in the remote control case 100 according to various embodiments of the disclosure, the center of the first controller 110 (or the second controller 130) may be higher than the cover 102. In an embodiment, the first controller 110 (or the second controller 130) of the remote control case 100 may be inclined to be higher from the rectangular first boundary 111 toward the center (P).

Figure 13:
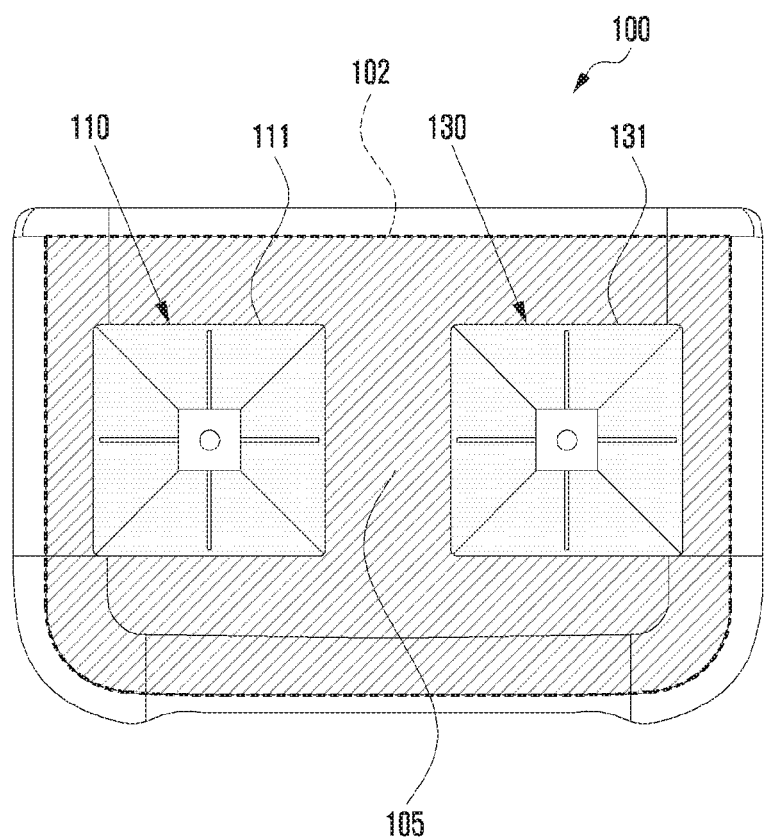
FIG. 13 is a diagram illustrating a difference in surface roughness between a control area composed of first and second controllers and a non-control area in a remote control case according to various embodiments of the disclosure.

FIG. 13 is a diagram illustrating a difference in surface roughness between a control area composed of first and second controllers and a non-control area in a remote control case according to various embodiments of the disclosure.

Referring to FIG. 13, in the remote control case 100 according to various embodiments of the disclosure, the first and second controllers 110 and 130 may be formed with surface roughness different from that of the non-control area 105 partially occupying the cover 102.

According to an embodiment, the first boundary 111 and the second boundary 131 may be formed of protrusions and irregularities such that the user can distinctively perceive, as tactile, the first boundary 111 of the first controller, the second boundary 131 of the second controller 130, and the non-control area 105. According to an embodiment, by using a surface processing or corrosion when manufacturing the remote control case 100, it is possible to form different patterns or corrosion depths in the first and second controllers 110 and 130 and the non-control area 105.

Figure 14:
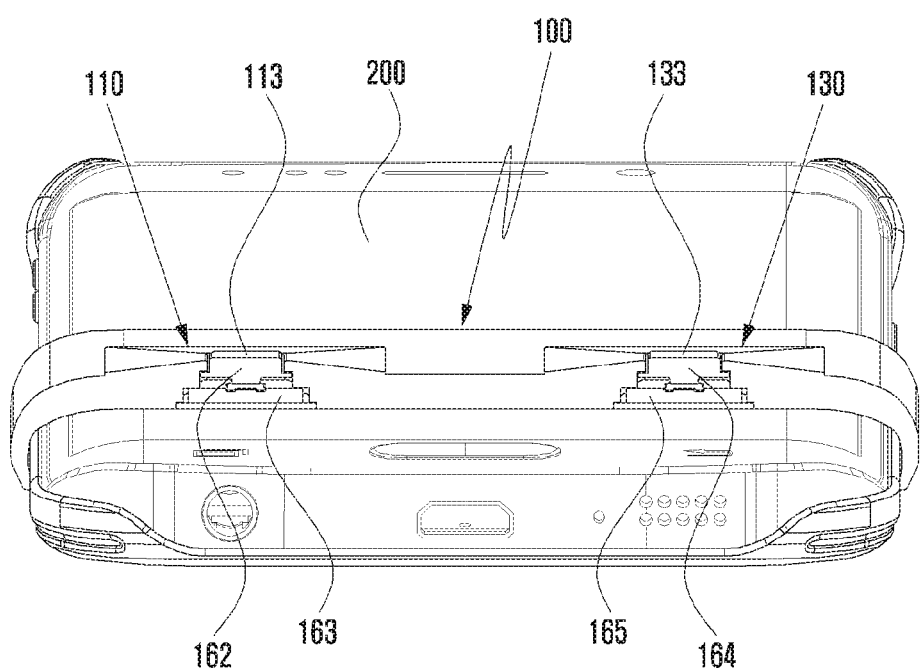
FIG. 14 is a diagram illustrating an example in which switches are installed under first and second controllers of a remote control case according to various embodiments of the disclosure.

FIG. 14 is a diagram illustrating an example in which switches are installed under first and second controllers of a remote control case according to various embodiments of the disclosure.

Referring to FIG. 14, in the remote control case 100 according to various embodiments of the disclosure, a first switch 162 and a first PCB 163 may be disposed below the first central protrusion 113 of the first controller 110. Also, a second switch 164 and a second PCB 165 may be disposed below the second central protrusion 133 of the second controller 130. Each of the first switch 162 and the second switch 164 may be formed of a dome switch. The first PCB 163 and the second PCB 165 may deliver turn-on signals of the first switch 162 and the second switch 164, respectively, to the electronic device 200.

According to an embodiment, when there is no user's touch signal in the first and second controllers 110 and 130 of the remote control case 100, reference points for manipulation positions of the flight application may be moved to the first and second central protrusions 113 and 133 through the first and second switches 162 and 164.

Figure 15:
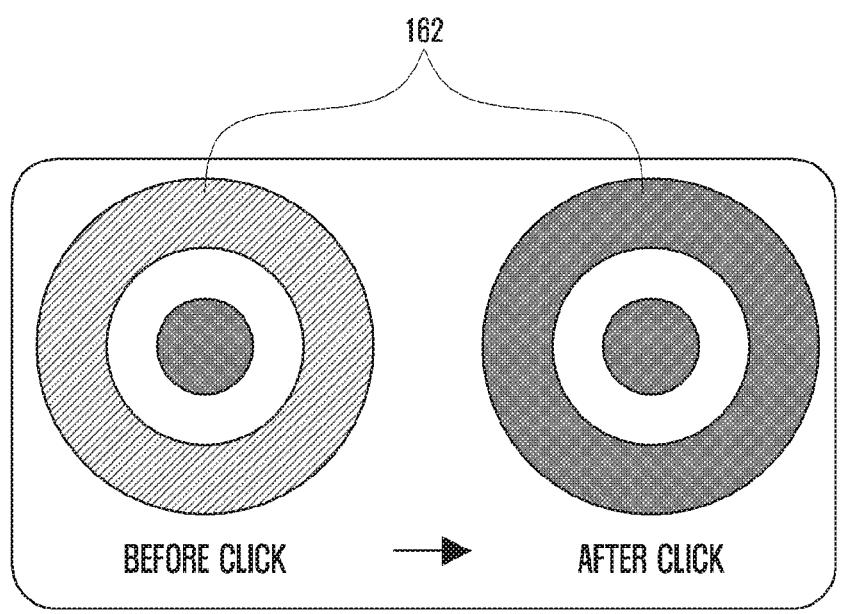
FIG. 15 is a diagram illustrating an example before and after clicking a first switch according to various embodiments of the disclosure.
Figure 16:
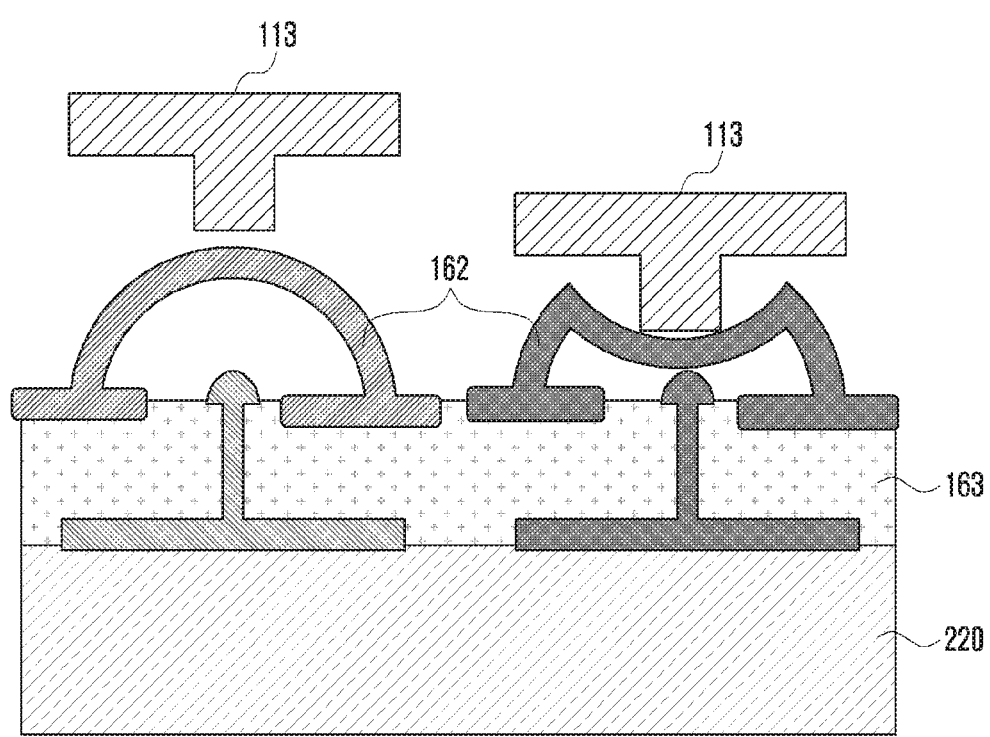
FIG. 16 is a diagram illustrating an example before and after clicking a first switch through a first central protrusion of a remote control case according to various embodiments of the disclosure.

According to an embodiment, the first switch 162 and the second switch 164 may provide frequently used functions in addition to manipulating functions for the attitude control of the unmanned aerial vehicle 700. For example, the first and second switches 162 and 164 may provide a calibration mode for setting a manipulation origin point of a program (e.g., the flight application) for manipulating the unmanned aerial vehicle 700. Only when the first and second switches 162 and 164 are clicked, the electronic device 200 may recognize the reference points for the manipulation positions of the flight application, and set up the recognized points of the first and second switches 162 and 164 as the manipulation origin point of the flight application. For reference, FIG. 15 is a diagram illustrating an example before and after clicking the first switch 162 according to various embodiments of the disclosure. FIG. 16 is a diagram illustrating an example before and after clicking the first switch 162 through the first central protrusion 113 of the remote control case 100 according to various embodiments of the disclosure. The first switch 162 may be disposed between the first central protrusion 113 and the touch screen 220. The second switch 164 may be disposed between the second central protrusion 133 and the touch screen 220.

Figure 17:
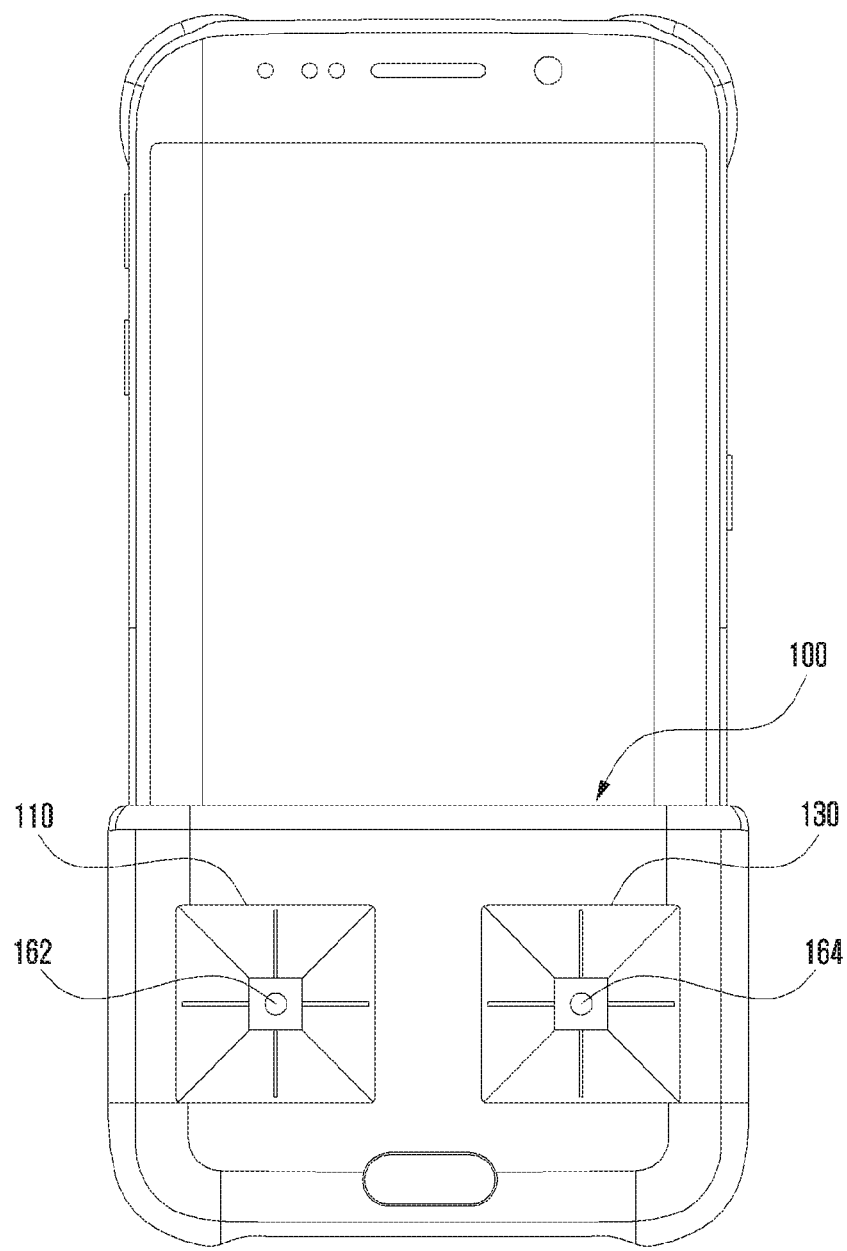
FIG. 17 is a diagram illustrating an example of using first and second switches of a remote control case according to various embodiments of the disclosure.

FIG. 17 is a diagram illustrating an example of using first and second switches of a remote control case according to various embodiments of the disclosure.

Referring to FIG. 17, in the remote control case 100 according to various embodiments of the disclosure, the first switch 162 of the first controller 110 and the second switch 164 of the second controller 130 may be used to input command signals for taking off and landing the unmanned aerial vehicle 700.

According to an embodiment, commands for taking off and landing the unmanned aerial vehicle 700 may be executed through an operation of simultaneously clicking the first and second switches 162 and 164 for a certain time (e.g., a long press for about 1 to 2 seconds). Thus, it is possible to control the takeoff and landing of the unmanned aerial vehicle 700 without much manipulation in the control area composed of the first and second controllers 110 and 130. This provides easy and convenient operations for takeoff and landing. In addition, inputting a physical manipulation signal through the first and second switches 162 and 164 rather than touching the first and second controllers 110 and 130 can prevent the takeoff and landing commands of the unmanned aerial vehicle 700 from being erroneously executed by a touch operation during the manipulation of the unmanned aerial vehicle 700.

As described above in various embodiments of the disclosure, the remote control case to be mountable on the electronic device includes the first and second controllers 110 and 130 having a rectangular shape and forming a physical manipulation architecture (e.g., a height difference, a central projection, a boundary, a guide projection, an inclined plane, and the like) for controlling the unmanned aerial vehicle 700. It is therefore possible to manipulating intuitively and precisely the unmanned aerial vehicle without looking at the screen of the electronic device.

While the disclosure has been described in detail with reference to specific embodiments, it is to be understood that various changes and modifications may be made without departing from the scope of the disclosure.

What is claimed is:

1. A remote control case comprising:
a cover for covering at least a part of a front surface of an electronic device;
a first gripper integrally formed with a first end surface of the cover and extended in a first direction of the cover so as to have a predetermined area; and
a second gripper integrally formed with a second end surface of the cover and extended in a second direction of the cover so as to have a predetermined area,
wherein the cover includes:
a first controller having a specific shape and a first boundary; and
a second controller having a specific shape and a second boundary,
wherein the first controller includes a first central protrusion formed within the first boundary such that a user manipulating the first controller perceives as a tactile sense a center of the first controller,
wherein the second controller includes a second central protrusion formed within the second boundary such that the user manipulating the second controller perceives as a tactile sense a center of the second controller,
wherein at least one guide protrudes from between the first boundary and the first central protrusion to allow the user to tactilely recognize a manipulation direction of the first controller, and
wherein at least one guide protrudes from between the second boundary and the second central protrusion to allow the user to tactilely recognize a manipulation direction of the second controller.

2. The remote control case of claim 1, wherein each of the first boundary of the first controller and the second boundary of the second controller is formed of a rectangular shape such that a touch manipulation range from the center is increased in a diagonal direction.

3. The remote control case of claim 1, wherein the cover includes a non-control area which is different in surface roughness from a control area comprising of the first and second controllers.

4. The remote control case of claim 1, wherein each end portion of the first and second grippers is bent inward to form an undercut so as to grip both sides of the electronic device.

5. The remote control case of claim 1, further comprising:
a first support integrally formed with a lower portion of the first gripper; and a second support integrally formed with a lower portion of the second gripper,
wherein the first and second supports support the electronic device so that the electronic device is not separated downward from the remote control case when the remote control case is mounted on a front or rear surface of the electronic device.

6. The remote control case of claim 1, wherein the first controller controls first and second functions of an unmanned object, and
wherein the second controller controls third and fourth functions of the unmanned object.

7. The remote control case of claim 1, wherein the first and second boundaries further include at least one of unevenness or surface roughness to be perceivable as a tactile sense by a user.

8. The remote control case of claim 1, wherein the cover includes a magnet receiving cavity formed on a rear surface thereof to mount a magnet for recognizing a mounting position of the remote control case on the electronic device.

9. The remote control case of claim 1, wherein a protective cover is disposed on a rear surface of the electronic device to cover and protect the electronic device, and
wherein the remote control case is mountable on the protective cover and, in case of manipulating an unmanned object, is mounted on a front surface of the electronic device to control the unmanned object.

10. The remote control case of claim 1, wherein the center of each of the first and second controllers is lower or higher than the cover.

11. An electronic device including a remote control case, the electronic device comprising:
a wireless communication unit configured to transmit and receive a remote control signal;
a touch screen configured to receive manipulation signal inputted through the remote control case and displaying a screen for manipulating an unmanned object;
a hall integrated circuit (IC) configured to detect, through a magnet disposed in the remote control case, that the remote control case is mounted on a front surface of the electronic device;
a memory configured to store a program for manipulating the unmanned object; and
a processor electrically connected to the memory,
wherein the processor is configured to automatically execute the unmanned object manipulating program stored in the memory when the magnet disposed in the remote control case coincides in position with the hall IC embedded in the electronic device,
wherein the remote control case includes a first controller with a first switch on a bottom center and a second controller with a second switch on a bottom center, and
wherein the processor performs a certain command when the first switch and the second switch are pressed simultaneously for a certain time duration.

12. The electronic device of claim 11, wherein the processor is configured to increase touch and proximity touch sensitivities in a mounting area where the remote control case is mounted, when the magnet disposed in the remote control case coincides in position with the hall IC embedded in the electronic device.

13. The electronic device of claim 11, wherein the processor is configured to control the touch screen to display a screen of manipulating the unmanned object on a remaining area other than a mounting area where the remote control case is mounted.

14. The electronic device of claim 11, wherein, when a touch is deviated from a control area comprising of first and second controllers of the remote control case, the processor is configured to notify a deviation from the control area using at least one of displaying a user interface through the touch screen, outputting a vibration through a vibration output unit of the electronic device, or outputting an audio signal through an audio output unit of the electronic device.

* * * * *